UNITED STATES PATENT OFFICE.

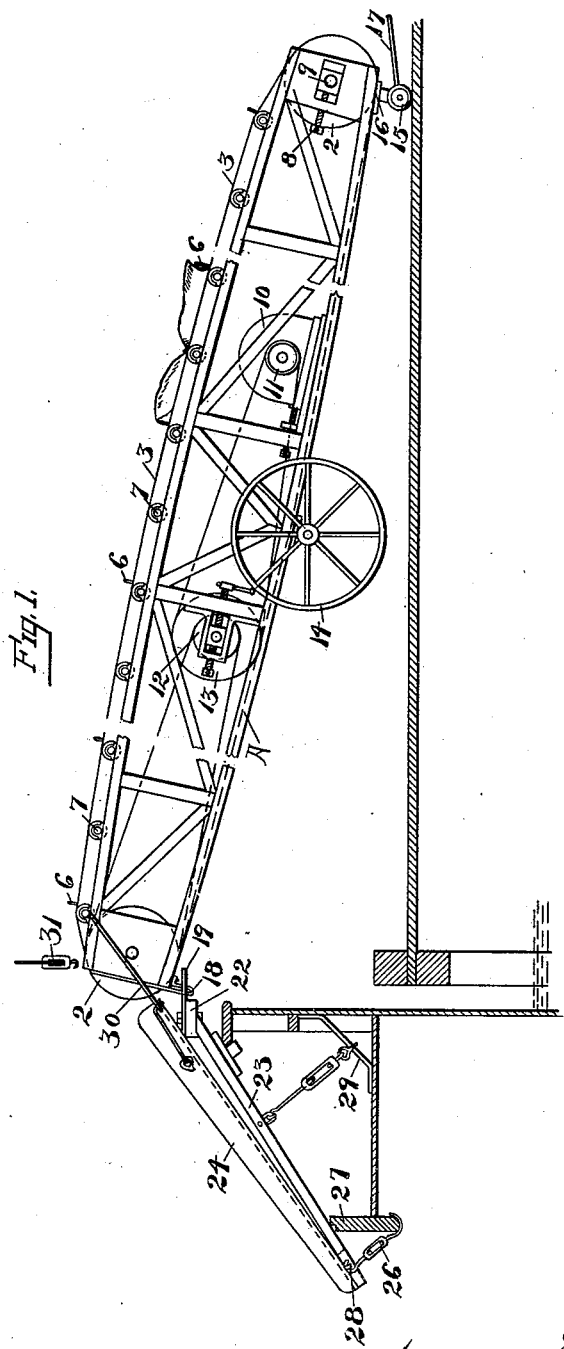

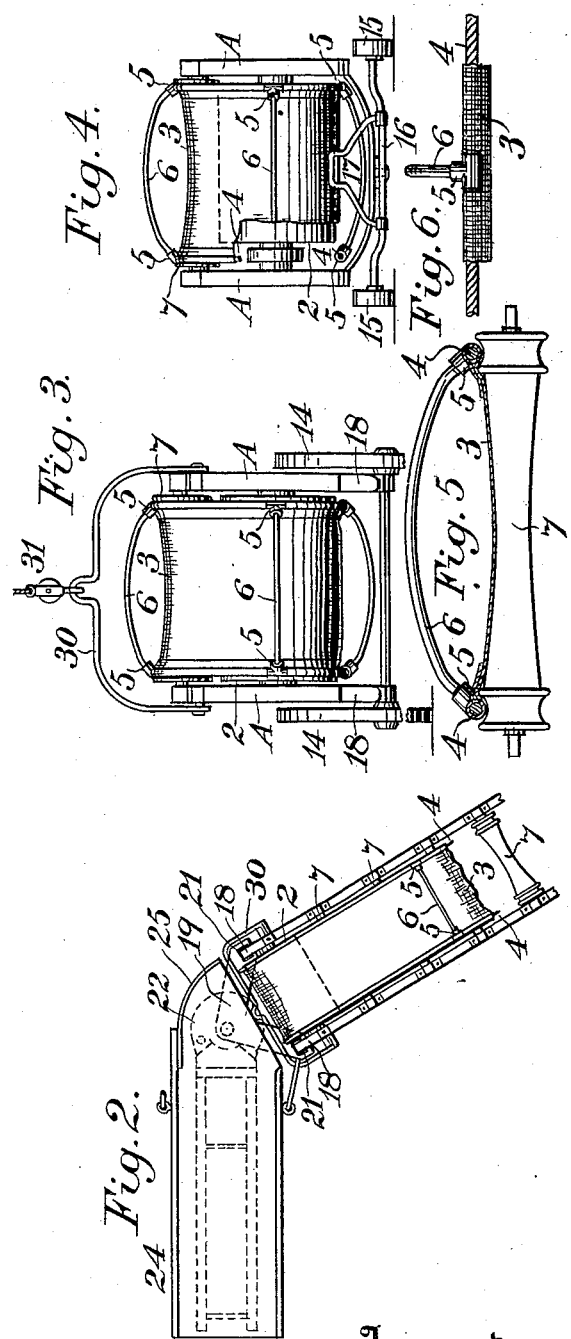

WARREN F. MILLS, OF SAN FRANCISCO, CALIFORNIA, ASSIGNOR OF ONE-HALF TO J. H. BENNETT, OF SAN FRANCISCO, CALIFORNIA.

DEVICE FOR LOADING VESSELS.

SPECIFICATION forming part of Letters Patent No. 712,948, dated November 4, 1902.

Application filed May 12, 1902. Serial No. 106,911. (No model.)

*To all whom it may concern:*

Be it known that I, WARREN F. MILLS, a citizen of the United States, residing in the city and county of San Francisco, State of California, have invented an Improvement in Devices for Loading Vessels and the Like; and I hereby declare the following to be a full, clear, and exact description of the same.

My invention relates to an apparatus which is especially designed for loading vessels and the like.

It consists of the parts and the constructions and combinations of parts which I will hereinafter describe and claim.

Figure 1 is a longitudinal elevation of my device shown in position for operating. Fig. 2 is a plan showing the carrying-belt frame placed in an approximately parallel position to a vessel for loading. Fig. 3 is an enlarged view of the upper end of the belt-frame. Fig. 4 is a similar view of the lower end of the same. Fig. 5 is an enlarged transverse section of the belt. Fig. 6 is a portion of a side view of the same.

It is the object of my invention to combine in a single working apparatus an endless traveling carrier one end of which is movable and adjustably located upon the wharf from which the load is to be taken and the other is turnable and adjustably connected with the chute upon which the load is to be received and by which it is directed to the point of deposit upon the vessel and in conjunction therewith of a means carried by the apparatus to provide the necessary power for driving the belts with adjustments therefor.

As here shown, the frame A is a truss-frame, made deepest substantially at the center and tapering in each direction to the ends where the pulleys 2 are journaled. Around these pulleys an endless belt 3 is fitted to travel. This belt is preferably made of stout canvas and has hems made at the edges through each of which a flexible wire rope passes, as at 4. At intervals upon these ropes are fixed T's 5, so as to stand in pairs opposite each other, the rope passing through the straight tubular portion of the T's and the other tubular parts projecting at right angles therewith and transversely to the belt. In these projecting parts are fixed the ends of the arched rigid bails 6, which are preferably made of iron and of sufficient stiffness to serve as carriers for any articles to be transported by the belt.

The device is especially designed for transporting grain and other products in sacks, and the sacks are delivered upon the belt just in front of these transverse arches, so that they will be prevented from slipping down, even although the carrier stands at a steep angle. The arches have also the effect of maintaining a transverse tension of the belt, preventing it from sagging unduly, and maintaining it substantially flat from side to side.

Any suitable number of rollers 7 are journaled in the upper part of the frame A, over which the belt travels, and by which it is sufficiently supported to prevent an undue sagging between the rollers. The belt may also be adjusted from time to time by screws 8, which carry the journal-boxes 9 at the lower end of the frame, these boxes being slidable in suitable guides in the usual manner for such adjustments.

Various means may be applied for applying power to drive the belt. I have found that a very suitable means is to fix an electric motor of sufficient strength to the lower part of the framework, as shown, at 10, and this motor is also so secured that it can be adjusted back or forward upon the frame. From a pulley 11 on the motor-shaft a belt passes around a pulley 12, the shaft of which is also adjustably journaled and carries a pulley 13, from which another belt leads to a pulley on the end of the shaft carrying the upper drum 2. These various pulleys are so proportioned as to reduce the speed between the motor and the carrying-belt to a rate at which it is desirable to have the carrying-belt travel. The shaft of the intermediate pulleys 12 and 13 is so mounted as to be adjustable backward and forward, and by the movement of this pulley-shaft the upper driving-belt is maintained at the proper tension, and by the movement of the motor the intermediate belt is also kept at a proper tension. The structure in this form is mounted upon wheels, as at 14, these wheels being approximately centrally located, so that the principal weight of the frame and its attachments will rest upon these wheels. At the lower end of the frame is another set of bearing-wheels 15, mounted upon an axle 16, which is concaved between the sides of the frame, so as to leave an ample space for the passage of the arched bails of the belt as they pass around the lower drum 2, and this axle has a tongue 17, by which it may be turned to one side or the other.

The upper end of the frame A is provided with hook-lugs, as at 18, and these are adapted to engage with a turn-table or equivalent structure 19, which turn-table is supported at the upper end of the receiving-chute into which the carrying-belt discharges. When the device is thus mounted, the lower end will rest upon its rollers 15 and the upper end will be supported upon the turn-table 19. The intermediate bearing-wheels 14 are either entirely raised from the floor, if the angle of the carrier is sufficiently steep, or, if the angle is low, the wheels may be temporarily removed from their axles to which they are secured by split pins. The axles of the wheels 15 being swiveled to the lower end of the frame may be turned so as to draw that end of the frame around to any desired point from which the load is to be taken, thus making this end easily adjustable, after which the wheels can be turned so that the handle will lie beneath the frame and out of the way. The wheels then standing in line with the frame will allow the apparatus to adjust itself to any rise or fall of the tide. The upper end being supported, as before stated, upon the turn-table 19, follows any movement of adjustment of the lower end and without disarranging this portion of the apparatus. This turn-table 19 is here shown in the form of a stout right-angled frame having its pivot at the angle and having the outer ends formed with slots or openings, as at 21, of such size as to admit the hook-lugs 18 of the upper end of the frame. The turn-table is supported upon a circular table 22, which may be made of wood or suitable material and is mounted upon the upper end of the chute or chute-frame 23, this frame being secured to the rail and hatchway or other convenient point of the vessel, so that the turn-table and its support are carried approximately above and a little outside of the vessel's rail, as shown. This allows for any turning movement of the carrier, so that it may stand approximately parallel with the vessel's side or at right angles therewith or at any intermediate point, its adjustment covering a full semicircle through which the lower end can be moved.

If the carrier stands in a straight line, the chute 24 may be a simple straight chute locked upon the supports, so that sacks or other articles delivered from the upper end of the carrier will be received into it and delivered upon the deck or into the hatchway, as may be desired. If the carrier is swung around to one side, the chute is provided with a curved guide 25, which is fixed to its upper end and in such a position that anything brought by the carrier when the latter stands at an angle with the line of delivery will be guided by this directing-piece 25 into the line of the chute. The chute itself or a support 23, upon which it may be mounted, is secured by means of hooks 26 with chains and turnbuckles connecting with a bolt through the chute-frame, so that the latter projecting over the edge of the hatchway—for example, as shown at 27—the hook is caught under the combing of the hatch and the upper end of the chain or turnbuckle-hook is hooked over the transverse bolt, as at 28. The turnbuckle may then be turned around until sufficient tension is brought to hold this part firmly. The upper end of the chute or its carrier is in like manner secured to braces, as at 29, and firmly and tightly drawn down upon the rail by the turnbuckles, thus holding the chute in a direct line from the rail to its point of discharge, while the carrier, as before stated, can be swiveled about the turn-table, so as to include a wide circle from which goods can be placed upon it. A bail 30 is swiveled to the upper end of the carrier-frame, and by means of suitable hoisting-tackle, as 31, it may be disengaged from the turn-table and suspended. When the carrier extends substantially at right angles with the vessel and the straight chute 24 is to be used, the bail 30 may be turned down over the end of its frame, and in this position it will support the upper end of chute 24, which is provided with hooks or attachments suitable for the purpose.

Having thus described my invention, what I claim, and desire to secure by Letters Patent, is—

1. A loading device for vessels and the like consisting of a frame, a chute and means for locking it upon the vessel's rail and hatchway an endless traveling belt and means for moving it, a turn-table or swiveled connection between the upper end of the carrier and the chute, and means by which the lower end may be moved about said swiveled center.

2. An apparatus for loading vessels and the like, consisting of a frame, wheels mounted at the lower end upon a central king-bolt, having a tongue by which they are turnable, hook-lugs at the upper end of the frame, and a turn-table with which they are adapted to connect, drums at the ends of the frame, an endless belt and means for propelling it about the drums, said belt having bails extending transversely across it.

3. An apparatus for loading vessels comprising a frame; drums at opposite ends thereof; a belt passing around said drums said belt having hems in the edges; ropes passing through said hems; tubular T's fitted in the ropes in pairs at opposite sides of the belt; rigid bails having their ends fixed in members of the T's and having their intermediate portions arched above the belt, and rollers journaled in the upper part of the frame and supporting the belt and the hemmed edges thereof.

4. The combination in an apparatus for loading vessels of a truss-frame having drums at opposite ends, an endless carrying-belt mounted upon the drums, a motor located within the frame adjustable thereon, and having a driving-pulley, pulleys intermediate between the motor and the upper drum and belts whereby power is transmitted from the motor to drive the carrying-belt, said intermediate pulley-shaft being also independently adjustable, a swiveled truck upon which the lower end of the belt-frame is adjustably supported and a turn-table supporting the upper end of the frame.

5. The combination in an apparatus for loading vessels and the like of a truss-frame, an endless carrying-belt having transverse bails and a motor located upon the frame through which power is transmitted to drive the carrying-belt, a support upon which the lower end of the frame is movable, a chute into which the upper end of the belt discharges, means for locking the chute upon the vessel's rail and hatchway a turn-table located at the junction of the chute and belt and connections between the belt-frame and the turn-table whereby said frame may be moved at any angle with relation to the chute.

6. The combination in an apparatus for loading vessels and the like of a truss-frame, a carrying-belt and motor located thereon, a chute, means for locking the chute upon the vessel's rail and hatchway, a turn-table supported upon the upper end of the chute-frame and connections by which the upper end of the carrying-belt frame may be connected with said turn-table.

7. The combination in a transferring apparatus of a frame, drums and endless traveling belt, with rigid transverse arched bails fixed thereto, a swivel-axle truck upon which the lower end of the carrier-frame is supported, said axle having a concave curvature between its ends to allow the bails to pass.

8. The combination in a transferring apparatus, of a frame with drums at the ends and an endless traveling belt thereon, a turn-table and support for the upper end, a bail and tackle by which to raise or suspend the upper end, said bail being turnable to lie below the carrier, and a chute with means for attaching it to the bail to hold it in position to receive the discharge from the carrier.

In witness whereof I have hereunto set my hand.

WARREN F. MILLS.

Witnesses:
S. H. NOURSE,
JESSIE C. BRODIE.